United States Patent
Tajima

(10) Patent No.: US 9,882,179 B2
(45) Date of Patent: Jan. 30, 2018

(54) SECONDARY BATTERY AND ELECTRONIC DEVICE INCLUDING SECONDARY BATTERY

(71) Applicant: SEMICONDUCTOR ENERGY LABORATORY CO., LTD., Atsugi-shi, Kanagawa-ken (JP)

(72) Inventor: Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/217,407

(22) Filed: Jul. 22, 2016

(65) Prior Publication Data

US 2017/0033327 A1    Feb. 2, 2017

(30) Foreign Application Priority Data

Jul. 29, 2015    (JP) .................................. 2015-149254

(51) Int. Cl.
| | |
|---|---|
| H01M 2/02 | (2006.01) |
| G06F 1/16 | (2006.01) |
| H01M 4/70 | (2006.01) |
| H01M 10/0525 | (2010.01) |
| H01M 4/485 | (2010.01) |
| H01M 4/134 | (2010.01) |

(52) U.S. Cl.
CPC .......... *H01M 2/0275* (2013.01); *G06F 1/163* (2013.01); *G06F 1/1635* (2013.01); *H01M 2/0212* (2013.01); *H01M 2/0287* (2013.01); *H01M 4/70* (2013.01); *H01M 4/134* (2013.01); *H01M 4/485* (2013.01); *H01M 10/0525* (2013.01); *H01M 2220/30* (2013.01)

(58) Field of Classification Search
CPC .......................... H01M 2/0275; H01M 2/0212
See application file for complete search history.

(56) References Cited

U.S. PATENT DOCUMENTS

| | | |
|---|---|---|
| 8,927,127 B2 | 1/2015 | Hosoya et al. |
| 9,281,543 B2 | 3/2016 | Hosoya et al. |
| 2015/0022957 A1 | 1/2015 | Hiroki et al. |
| 2015/0111088 A1 | 4/2015 | Hiroki et al. |

(Continued)

FOREIGN PATENT DOCUMENTS

| | | |
|---|---|---|
| JP | 2013-140781 A | 7/2013 |
| JP | 2014-049193 A | 3/2014 |

(Continued)

*Primary Examiner* — Olatunji Godo
(74) *Attorney, Agent, or Firm* — Nixon Peabody LLP; Jeffrey L. Costellia

(57) ABSTRACT

An electronic device having a novel structure is provided. Specifically, an electronic device having a novel structure that can change its form into various appearances is provided. In a secondary battery, a foldable portion from which part of the components is removed by forming openings in a current collector becomes thin and can be more likely to be bent than the other regions. A cylindrical cushioning material overlapping with the foldable position of the secondary battery is provided. The provision of this cushioning material makes it possible to fix the minimum radius of curvature of the secondary battery at the foldable position. Accordingly, it is possible to prevent the exterior body from being broken due to bending along a curved surface with a smaller radius of curvature than a diameter of the cushioning material.

15 Claims, 10 Drawing Sheets

(56) References Cited

U.S. PATENT DOCUMENTS

| | | |
|---|---|---|
| 2015/0155528 A1 | 6/2015 | Takahashi et al. |
| 2015/0243962 A1 | 8/2015 | Hiroki et al. |
| 2016/0013469 A1 | 1/2016 | Tajima et al. |
| 2016/0156061 A1 | 6/2016 | Hosoya et al. |

FOREIGN PATENT DOCUMENTS

| | | |
|---|---|---|
| JP | 2015-038868 A | 2/2015 |
| WO | WO-2015/008716 | 1/2015 |

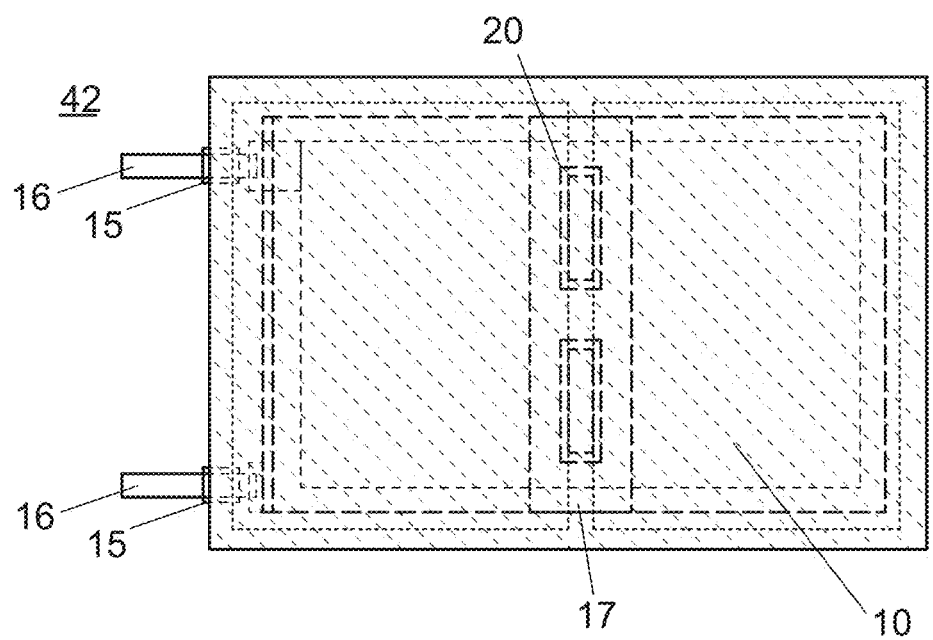

SECONDARY BATTERY AND ELECTRONIC DEVICE INCLUDING SECONDARY BATTERY

BACKGROUND OF THE INVENTION

1. Field of the Invention

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

Note that electronic devices in this specification generally mean devices including secondary batteries, and electro-optical devices including secondary batteries, information terminal devices including secondary batteries, and the like are all electronic devices.

2. Description of the Related Art

Electronic devices carried around by users and electronic devices worn by users have been actively developed. For example, a thin portable electronic book is disclosed in Patent Document 1.

Such portable electronic devices and wearable electronic devices operate using secondary batteries as power sources. Portable electronic devices need to withstand the use for a long period and thus may incorporate high-capacity secondary batteries. Since high-capacity secondary batteries are large in size, their incorporation in electronic devices increases the weight of the electronic devices. Thus, small or thin high-capacity secondary batteries that can be incorporated in portable electronic devices are under development.

Patent Document 1 discloses a square lithium-ion secondary battery in which an active material mixture layer consists of a region with a plurality of openings and a region without openings and at least a bent portion of a collective sheet is covered with the region with the plurality of openings.

Patent Document 2 discloses a structure in which a flexible secondary battery partly overlaps with a flexible display panel over a structure body having a curved surface.

REFERENCE

Patent Document

[Patent Document 1] Japanese Published Patent Application No. 2013-140781

[Patent Document 2] Japanese Published Patent Application No. 2015-38868

SUMMARY OF THE INVENTION

A metal can that is used as an exterior body has a problem of increasing the weight of a secondary battery. Moreover, it is difficult to manufacture a thin metal can by molding and also to fabricate a secondary battery using a thin metal can, in order to obtain a thin secondary battery.

The use of a film (also referred to as a laminate film) including a stack of metal foil (e.g., aluminum foil, stainless steel foil) and a resin (heat-seal resin) as an exterior body allows fabrication of a secondary battery that is thinner and more lightweight than a secondary battery that uses a metal can.

In order that a user can comfortably wear a display device used while being worn on a human body, the display device needs to have a light weight and a small size, and in addition, the whole electronic device including a driver device for the display device and a power source needs to have a light weight.

An electronic device having a novel structure, specifically, an electronic device having a novel structure that can change its form into various appearances is provided.

An object of one embodiment of the present invention is to provide a novel power storage device, a novel secondary battery, or the like. Note that the descriptions of these objects do not disturb the existence of other objects. In one embodiment of the present invention, there is no need to achieve all the objects. Other objects will be apparent from and can be derived from the description of the specification, the drawings, the claims, and the like.

A thin electronic device which can be more compact by folding its display portion has been proposed. Such a thin electronic device has a limited space; thus, it is difficult to secure a place where a secondary battery is to be provided. When a small thickness and a light weight are emphasized, it is preferable to reduce the number of components.

In view of them, a structure in which not only the display portion but also the secondary battery can be folded, that is, a secondary battery including a portion to be folded will be proposed.

An electronic device disclosed in this specification is an electronic device which includes a display portion which can be folded at two or more points and a secondary battery which can be folded at two or more points. The foldable points of the display portion and the foldable points of the secondary battery overlap with each other.

In the above electronic device, the display portion may include a display element over a flexible film, and the secondary battery may include an exterior body including a metal film.

In the above electronic device, a cylindrical cushioning material overlapping with the foldable points of the secondary battery may be further included. The cushioning material may have a diameter of 30 mm or less, or preferably have a diameter of 10 mm or less. Providing this cushioning material makes it possible to fix the minimum radius of curvature of the secondary battery at the foldable points. Accordingly, it is possible to prevent the exterior body from being broken due to bending along a curved surface with a smaller radius of curvature than a diameter of the cushioning material. In addition, the foldable points of the secondary battery are thinner than the other points; thus, an empty space formed at the time of folding can be kept by the cushioning material, which can keep the folded secondary battery in shape.

In the above electronic device, a radius of curvature of each of the foldable points of the display portion can be 30 mm or less, and a radius of curvature of each of the foldable points of the secondary battery can be 30 mm or less.

In the above electronic device, the secondary battery may include a first current collector, a second current collector, a separator, and an exterior body. The secondary battery may include a first region where the first current collector and the second current collector overlap with each other and a second region which is thinner than the first region. The second region may include a region where an opening of the first current collector and an opening of the second current collector overlap with each other. The second region may include the foldable point of the secondary battery.

A structure of the secondary battery is also one of the inventions disclosed in this specification. The structure is a secondary battery which includes a first current collector, a second current collector, a separator, and an exterior body. The secondary battery includes a first region where the first current collector and the second current collector overlap with each other and a second region which is thinner than the first region. The second region includes a region where an opening of the first current collector and an opening of the second current collector overlap with each other. The second region includes a foldable point of the secondary battery.

In the above secondary battery, an opening of the separator and the opening of the first current collector may overlap with each other in the second region.

A structure of another secondary battery is a secondary battery which includes a first current collector, a second current collector, a separator, an electrolytic solution, and an exterior body. The secondary battery includes two first regions where the first current collector and the second current collector overlap with each other, a second region which is thinner than each of the two first regions, and a third region which is a periphery of the secondary battery. The third region is in contact with the two first regions and the second region. The second region is a pressure-bonded region between the two first regions and the electrolytic solution is surrounded by the exterior body in each of the two first regions. The thickness of the third region is equal to or less than that of the second region.

In the above secondary battery, the second region may include a foldable point of the secondary battery.

In the above secondary battery, an opening of the first current collector, an opening of the second current collector, and an opening of the separator may overlap with each other in the second region.

In the above secondary battery, a cylindrical cushioning material overlapping with the second region may be further included. The cushioning material may have a diameter of 30 mm or less, or preferably have a diameter of 10 mm or less.

In the above secondary battery, the secondary battery can change its form at its foldable points with a radius of curvature in the range of 30 mm or less, preferably 10 mm or less. One or two metal films are used as the exterior body of the secondary battery. When the secondary battery with a layered structure is bent to have an arc-shaped cross section, the secondary battery has a structure in which the components thereof are sandwiched between the two curved surfaces of the film.

Description will be given of the radius of curvature of a surface with reference to FIGS. 7A to 7C. In FIG. 7A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center of curvature 1704. FIG. 7B is a top view of the curved surface 1700. FIG. 7C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

In the case of bending a secondary battery in which a component 1805 including electrodes, an electrolytic solution, and the like is sandwiched between two films as exterior bodies, a radius of curvature 1802 of a film 1801 close to a center of curvature 1800 of the secondary battery is smaller than a radius of curvature 1804 of a film 1803 far from the center of curvature 1800 (FIG. 8A). When the secondary battery is bent to have an arc-shaped cross section, compressive stress is applied to a surface of the film on the side closer to the center of curvature 1800 and tensile stress is applied to a surface of the film on the side farther from the center of curvature 1800 (FIG. 8B).

In the above structure, the metal film serving as the exterior body is subjected to pressing, such as embossing, and a pattern including projections or depressions is formed on a surface of the exterior body. Thus, the influence of a strain can be reduced to be acceptable even when compressive stress and tensile stress are applied as described above. For this reason, the radius of curvature of the exterior body on the side closer to the center of curvature can be 30 mm or less, preferably 10 mm or less at a portion where the secondary battery is to be folded. Note that embossing, which is a kind of pressing, is not necessarily employed and any method that allows formation of a relief on part of the film is employed. A combination of the processing, for example, embossing and any other pressing may be performed on one film. Alternatively, embossing may be performed on one film more than once. Note that embossing is a kind of pressing and refers to processing for forming unevenness corresponding to unevenness of an embossing roll on a film by bringing the embossing roll whose surface has unevenness into contact with the film with pressure. The embossing roll is a roll whose surface is patterned.

Note that the cross-sectional shape of the secondary battery is not limited to a simple arc, and the cross section can be partly arc-shaped; for example, the cross section can have an S shape as illustrated in FIG. 8D which is formed by folding a secondary battery illustrated in FIG. 8C in three at two points. A portion that is easier to fold than the other portions can be provided in such a manner that the components are not provided or limitedly provided in the foldable portion of the secondary battery. When the curved surface of the secondary battery has a shape with a plurality of centers of curvature 1800 as illustrated in FIG. 8D, the secondary battery can change its form in such a range that a curved surface with the smallest radius of curvature among radii of curvature with respect to the plurality of centers of curvature, which is a surface of one of the two exterior bodies on the side closer to the center of curvature, has a curvature radius of less than or equal to 30 mm, preferably less than or equal to 10 mm.

A plurality of conventional flat secondary batteries can be included in an electronic device for increasing a capacity of the battery. However, this has a problem of increased number of the components because a protection circuit and a control circuit are needed for each of the secondary batteries. In contrast, the secondary battery which can change its form into an S shape as illustrated in FIG. 8D is one foldable secondary battery and needs only one protection circuit and one control circuit, so that the number of components can be reduced.

When the secondary battery is bent with the center of curvature being on the inner side and seen in cross section, the outside surface is stretched and the inside surface is compressed. In other words, the outside expands and the inside contracts. The bendable secondary battery can also be called an elastic secondary battery.

When a secondary battery in which an electrolytic solution is sandwiched between two films serving as exterior bodies is bent, the radius of curvature of a first film is smaller than that of a second film. When the secondary battery is bent to have an arc-shaped cross section, compressive stress is applied to a surface of the film on the side closer to the center of curvature and tensile stress is applied to a surface of the film on the side farther from the center of curvature.

Even when compressive stress or tensile stress is applied to a film surface in such a manner, the influence of a stain can be reduced to be acceptable if a surface of the exterior body has a pattern including projections or depressions.

The number or size of components that can be incorporated in an electronic device is determined depending on the volume of a space formed by a housing of the electronic device in many cases. Providing a flexible secondary battery in a small space between components other than the secondary battery enables a space formed by a housing of an electronic device to be efficiently used; thus, the electronic device can be reduced in size.

Examples of wearable devices include wearable input terminals such as a wearable camera, a wearable microphone, and a wearable sensor, wearable output terminals such as a wearable display and a wearable speaker, and wearable input/output terminals having the functions of any of the input terminals and any of the output terminals. Another example of a wearable device is a device that controls each device and calculates or processes data, typically, a wearable computer including a CPU. Other examples of wearable devices include devices that store data, send data, and receive data, typically, a portable information terminal and a memory.

A secondary battery having a novel structure can be provided. A novel power storage device can be provided.

The form of a secondary battery can be freely designed and when a secondary battery having a portion to be folded is used for example, the design flexibility of a whole device is increased and devices having a variety of designs can be fabricated.

Furthermore, the secondary battery can be provided on the inner curved surface of a device along the outer curved surface of the foldable display portion without making a redundant space in the device having a portion to be folded; thus, a space in the device can be effectively used.

Thus, an electronic device having a novel structure can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIG. 3 is a top view of a secondary battery of one embodiment of the present invention;

DETAILED DESCRIPTION OF THE INVENTION

Figure 1A:
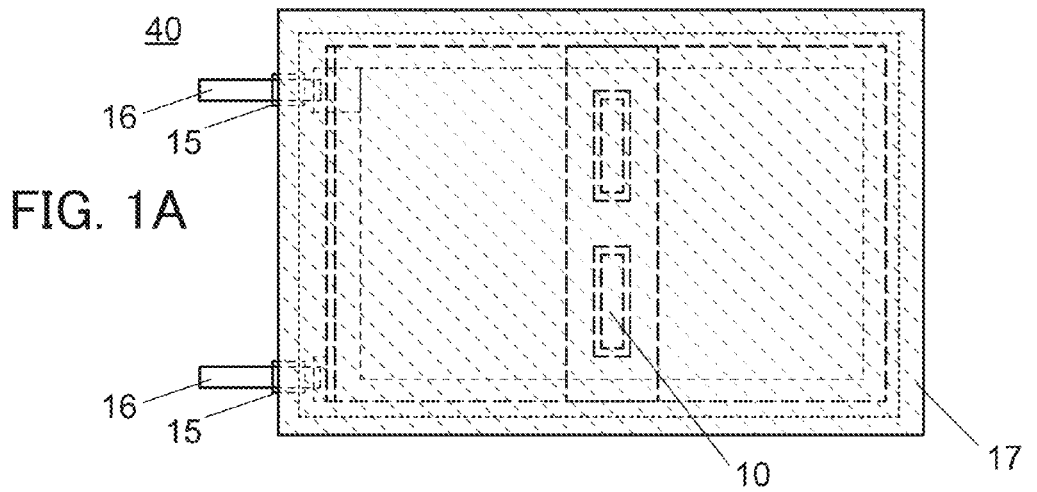
FIGS. 1A to 1D are top views and a perspective view of a secondary battery of one embodiment of the present invention.

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to description of the embodiments below.

The term "electrically connected" includes the case where components are connected through an "object having any electric function. There is no particular limitation on the "object having any electric function" as long as electric signals can be transmitted and received between the components connected through the object.

The position, size, range, or the like of each component illustrated in drawings and the like is not accurately represented in some cases for easy understanding. Therefore, the disclosed invention is not necessarily limited to the position, size, range, or the like disclosed in the drawings and the like.

Ordinal numbers such as "first," "second," and "third" are used to avoid confusion among components.

Embodiment 1

In this embodiment, an example of fabricating a lithium-ion secondary battery with a foldable point which is formed using a metal film as an exterior body and using a devised structure of the components such as a current collector, a separator, and an active material layer will be described.

First, a sheet film made of a flexible material is prepared. As the sheet film, a stack, a metal film provided with an adhesive layer (also referred to as a heat-seal layer) or sandwiched between adhesive layers, is used. As the adhesive layer, a heat-seal resin film containing polypropylene, polyethylene, or the like is used. In this embodiment, a metal film, specifically, aluminum foil whose top surface is provided with a nylon resin and whose bottom surface is provided with a stack including an acid-proof polypropylene film and a polypropylene film is used as the sheet film.

The metal film is an exterior body to surround and seal the components.

Figure 1B:
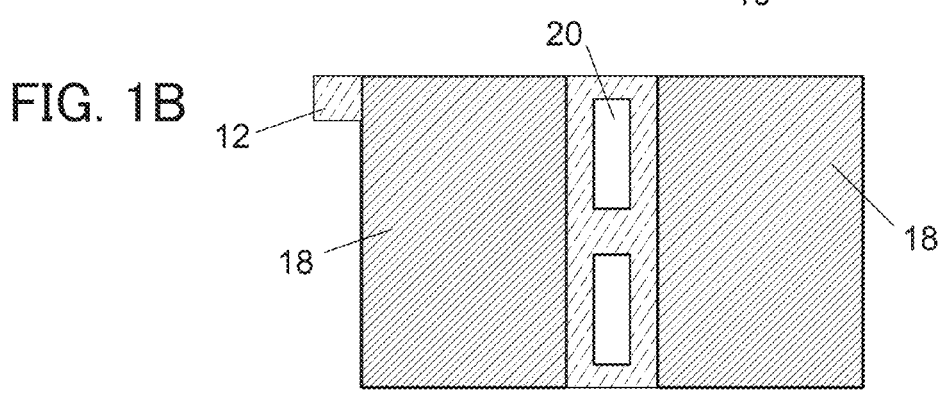

A positive electrode, one of the components, is prepared. A positive electrode current collector 12 on part of the surface of which positive electrode active material layers 18 are formed is used as the positive electrode. As illustrated in FIG. 1B, the positive electrode current collector 12 includes openings 20. FIG. 1B illustrates an example of a top view of the positive electrode. The positive electrode active material layers 18 are selectively formed as illustrated in FIG. 1B, and a protruding portion of the positive electrode current collector 12 and the openings 20 and their vicinities are not provided with the positive electrode active material layers 18. A portion of the positive electrode current collector 12 where the openings 20 are provided is a foldable portion of the secondary battery. Note that although FIG. 1B illustrates an example in which two rectangular openings 20 are provided, the shape and the number are not particularly limited thereto. A shape of the opening seen from above may be an ellipse and the number of the openings may be one or three or more.

A negative electrode, one of the components, is prepared. A negative electrode current collector 14 on part of the surface of which a negative electrode active material layer is formed is used. In this embodiment, the negative electrode also includes an opening.

The positive electrode current collector 12 and the negative electrode current collector 14 can each be formed using a highly conductive material that is not alloyed with a carrier ion of, for example, lithium, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 μm to 40 μm inclusive.

Examples of positive electrode active materials that can be used for the positive electrode active material layer 18 include a composite oxide with an olivine structure, a composite oxide with a layered rock-salt structure, and a composite oxide with a spinel structure. As the positive electrode active material, a compound such as $LiFeO_2$, $LiCoO_2$, $LiNiO_2$, $LiMn_2O_4$, $V_2O_5$, $Cr_2O_5$, and $MnO_2$ is used, for example.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$ (M=Mn, Co, or Ni), a vanadium oxide ($V_2O_5$, $V_6O_{13}$, $LiV_3O_8$, or the like), a manganese oxide, an organic sulfur compound, or the like can be used for the positive electrode active material.

In the case where carrier ions are alkali metal ions other than lithium ions, or alkaline-earth metal ions, a material containing an alkali metal (e.g., sodium or potassium), an alkaline-earth metal (e.g., calcium, strontium, barium, beryllium, or magnesium) instead of lithium may be used for the positive electrode active material.

A material with which lithium can be dissolved and precipitated or a material into and from which lithium ions can be intercalated and extracted can be used for a negative electrode active material of the negative electrode active material layer; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material which enables charge-discharge reaction by an alloying reaction and a dealloying reaction with lithium can also be used. In the case where carrier ions are lithium ions, a material containing at least one of Al, Si, Ge, Sn, Pb, Sb, Bi, Ag, Au, Zn, Cd, In, Ga, and the like can be used, for example. Such elements have higher capacity than carbon. In particular, silicon has a significantly high theoretical capacity of 4200 mAh/g. For this reason, silicon is preferably used for the negative electrode active material. Examples of the material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a material containing two or more of single crystal silicon, amorphous silicon, polycrystalline silicon, $Si_2O_3$, $Si_3O_4$, $Si_2O$, and $SiO_2$ and is a colored material. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, as the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, as the negative electrode active material, $Li_{(3-x)}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case the negative electrode active material includes lithium ions and thus can be used in combination with a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer may further include a binder for increasing adhesion of active materials, a conductive additive for increasing the conductivity of the negative electrode active material layer, and the like in addition to the above negative electrode active materials.

A procedure for forming openings over an exposed current collector in such a manner that an active material layer is selectively formed over the current collector and then removed will be described below.

Specifically, after an active material layer is formed over a current collector, laser processing for removing part of the current collector and part of the active material layer in an irradiation region is performed using laser light or the like. An opening, a cut, or a gap which can be made by cutting by laser processing can have a linear shape, a geometric shape (e.g., a polygonal shape or an indefinite shape), or a circular shape.

In this embodiment, an example in which both of the positive electrode and the negative electrode are provided with openings is described. However, at least one of the positive electrode and the negative electrode may be subjected to laser processing and provided with an opening as long as foldable points can be formed in the secondary battery.

The cutting processing is not limited to laser processing by which part of the current collector and part of the active material layer are removed. The cutting processing may be performed by punching. Furthermore, instead of performing cutting by scanning part of the current collector and part of the active material layer with laser light, ultra-high pressure water may be discharged to part of the current collector and part of the active material layer to remove part of the current collector and part of the active material layer.

Figure 1C:
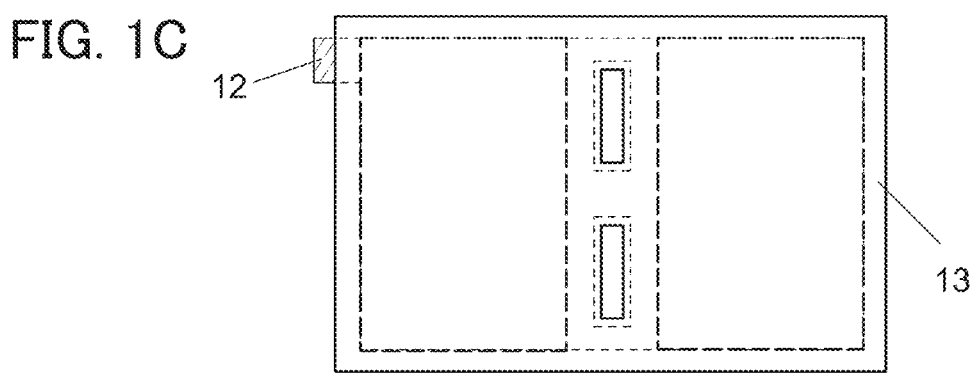

In addition, the separator 13 is also provided with openings. FIG. 1C illustrates an example of a top view in which the separator 13 with openings is provided over the positive electrode. As the separator 13, an insulator such as cellulose (paper), polypropylene with pores, and polyethylene with pores can be used. Openings are not necessarily provided so as to prevent a short-circuit between the positive electrode and the negative electrode at the time of folding the secondary battery at the foldable points.

Figure 1D:
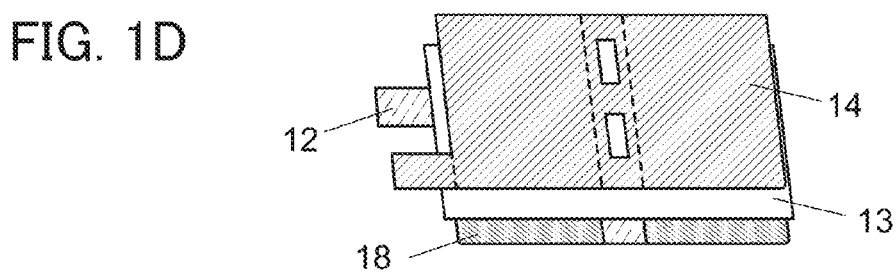

FIG. 1D is a perspective view in which the separator 13 with openings is provided over the positive electrode with openings illustrated in FIG. 1B and the negative electrode is further provided over the separator 13. Note that the negative electrode active material layer is not illustrated in FIG. 1D; however, the negative electrode active material layer is provided in contact with the negative electrode current collector 14 between the negative electrode current collector 14 and the separator 13. The negative electrode active material layer is selectively provided for the negative electrode current collector 14, and the openings and their vicinities and a protruding portion of the negative electrode current collector 14 are not provided with the negative electrode active material layer.

In the example illustrated here, for simplicity, one stack including the positive electrode current collector 12, the separator 13, and the negative electrode current collector 14 is held in the exterior body.

Two lead electrodes 16 with sealing layers 15 are prepared after the stack illustrated in FIG. 1D is prepared. The lead electrodes 16 are each also referred to as a lead terminal and provided in order to lead a positive electrode or a negative electrode of a secondary battery to the outside of an exterior film. Aluminum is used for the positive electrode lead and nickel-plated copper is used for the negative electrode lead.

Then, the positive electrode lead is electrically connected to a protruding portion of the positive electrode current collector 12 by ultrasonic welding or the like, and the negative electrode lead is electrically connected to a protruding portion of the negative electrode current collector 14 by ultrasonic welding or the like.

Next, the periphery of the metal film 10 is sealed by thermocompression bonding, and one side is left open for introduction of an electrolytic solution. In this embodiment, one rectangular metal film 10 is folded in half and two end portions are made to overlap with each other for sealing. In thermocompression bonding, the sealing layers 15 provided on the lead electrodes are also melted, thereby fixing the lead electrodes and the metal film 10 to each other. After that, in reduced pressure or an inert gas atmosphere, a desired amount of electrolytic solution is dropped to the inside of the metal film 10 in the form of a bag. Then, the remaining open side of the periphery of the metal film 10 is sealed under vacuum, heat, and pressure. An edge region out of a dotted line in a secondary battery 40 in FIG. 1A is a thermocompression-bonded region 17. This treatment is performed in an environment from which oxygen is eliminated, for example, in a glove box. The evacuation to a vacuum may be performed with a vacuum sealer, a liquid pouring sealer, or the like. The metal film 10 can be set between two heatable bars included in the sealer, and sealing can be performed under heat and pressure. An example of the conditions is as follows: the degree of vacuum is 60 kPa, the heating temperature is 190° C., the pressure is 0.1 MPa, and the time is 3 seconds.

Then, the secondary battery obtained through the above-described steps is preferably subjected to aging treatment. By this aging treatment, formation of a film generated at the interface between the electrode and the electrolyte is controlled and the active material can be activated.

Furthermore, the secondary battery that has been subjected to the aging treatment may be opened to let out a gas generated by the aging and then an electrolytic solution may be added and sealing may be performed again. If a gas exists between the positive electrode and the negative electrode, the battery reaction occurs unevenly to cause deterioration. The degassing and resealing steps can suppress deterioration.

As the electrolyte of the electrolytic solution, a material containing lithium ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the secondary battery can be thinner and more lightweight. Typical examples of the gelled high-molecular material include a silicone gel, an acrylic gel, an acrylonitrile gel, a poly(ethylene oxide)-based gel, a poly(propylene oxide)-based gel, a gel of a fluorine-based polymer, and the like. Alternatively, the use of one or more of ionic liquids (room temperature molten salts) which have features of non-flammability and non-volatility as a solvent of the electrolytic solution can prevent the secondary battery from exploding or catching fire even when the secondary battery internally shorts out or the internal temperature increases owing to overcharging or the like. An ionic liquid is a salt in the fluid state and has high ion mobility (conductivity). Furthermore, the ionic liquid includes a cation and an anion. Examples of such an ionic liquid are an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. In the case of using the solid electrolyte, a separator or a spacer is not necessary. Furthermore, the battery can be entirely solidified; therefore, there is no possibility of liquid leakage and thus the safety of the battery is dramatically increased.

In this manner, a secondary battery 40 illustrated in FIG. 1A can be fabricated.

Note that in the example illustrated here, for simplicity, one stack including the positive electrode current collector 12, the separator 13, and the negative electrode current collector 14 is held in the exterior body. To increase the capacity of a secondary battery, a plurality of the stacks may be stacked and held in an exterior body. When the plurality of the stacks are held in an exterior body, the exterior body may be subjected to pressing in advance to form a space in which the stack is to be held.

The secondary battery illustrated in FIG. 1A can be folded along a region connecting two openings of the current collector. This region overlapping with the openings hardly serves as a battery because the region includes only the electrolytic solution. In the secondary battery illustrated in FIG. 1A, the foldable region from which some of the components are removed becomes thin and can be more likely to fold than the other regions. Since the openings and their vicinities are not configured to function as a battery, folding of the secondary battery hardly affects charging and discharging of the secondary battery.

In an example in this embodiment, one rectangular metal film is folded in half and two end portions are made to overlap with each other for sealing. However, the shape of the film is not limited to a rectangle and can be a polygon such as a triangle, a square, or a pentagon or any symmetric shape other than a rectangle, such as a circle or a star. Alternatively, two rectangular films can be used. In this case, two films overlap with each other and four sides are all sealed by thermocompression bonding.

Although an example of a small battery used in a portable information terminal or the like is described in this embodiment, one embodiment of the present invention is not particularly limited to this example. Application to a large battery provided in a vehicle or the like is also possible.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible. Furthermore, application to a solar cell, an optical sensor, a touch sensor, a display device, a flexible printed circuit (FPC), an optical film (e.g., a polarizing plate, a retardation plate, a prism sheet, a light reflective sheet, and a light diffusion sheet), and the like is also possible.

Embodiment 2

In this embodiment, an example of fabricating a lithium-ion secondary battery with the use of a metal film 11 whose surface is embossed and provided with a pattern will be described.

The structure is similar to that of Embodiment 1 except for the embossed metal film 11 with a pattern used as an exterior body; therefore, detailed description is omitted in this embodiment.

The pattern of the film is a geometric pattern in which lines slanted in two directions cross each other and which can be visually recognized. In the case of such a geometric pattern in which lines slanted in two directions cross each other, stress due to bending can be relieved in at least two directions. The depressions or projections are not necessarily arranged regularly and may be arranged randomly. Random arrangement enables stress due to not only two-dimensional bending but stress due to three-dimensional random bending or twisting to be relieved. The film may partly include a plurality of regions having different patterns. For example, the film may be provided with different patterns at the corner and at the center, providing one film with two types of patterns. Alternatively, the film may be provided with three or more types of patterns. The film may be provided with depressions or projections only in a bendable portion and may have a flat surface in the other portion. Note that there is no particular limitation on the shapes of depressions or projections.

The depressions or projections of the film are formed by pressing, e.g., embossing. The depressions or projections of a surface (or a rear surface) of the film formed by embossing form an enclosed space that is sealed by the film serving as a part of a wall of the sealing structure and whose inner volume is variable. It can be said that the depressions or projections of the film form an accordion structure (bellows structure) in this enclosed space. The sealing structure using the film can prevent entry of water and dust. Note that embossing, which is a kind of pressing, is not necessarily employed and any method that allows formation of a relief on part of the film is employed. A combination of the methods, for example, embossing and any other pressing may be performed on one film. Alternatively, embossing may be performed on one film more than once.

In this embodiment, the metal film 11 with a pattern is prepared, and the metal film 11 with a pattern is folded in half so that two end portions overlap with each other, and is sealed on three sides with an adhesive layer.

The metal film 11 with a pattern is formed into a bag shape. The components contained therein are the same as those in Embodiment 1; therefore, description is omitted here. The components are a positive electrode current collector with openings, a separator, a negative electrode current collector with openings, an electrolytic solution, and the like.

Figure 2A:
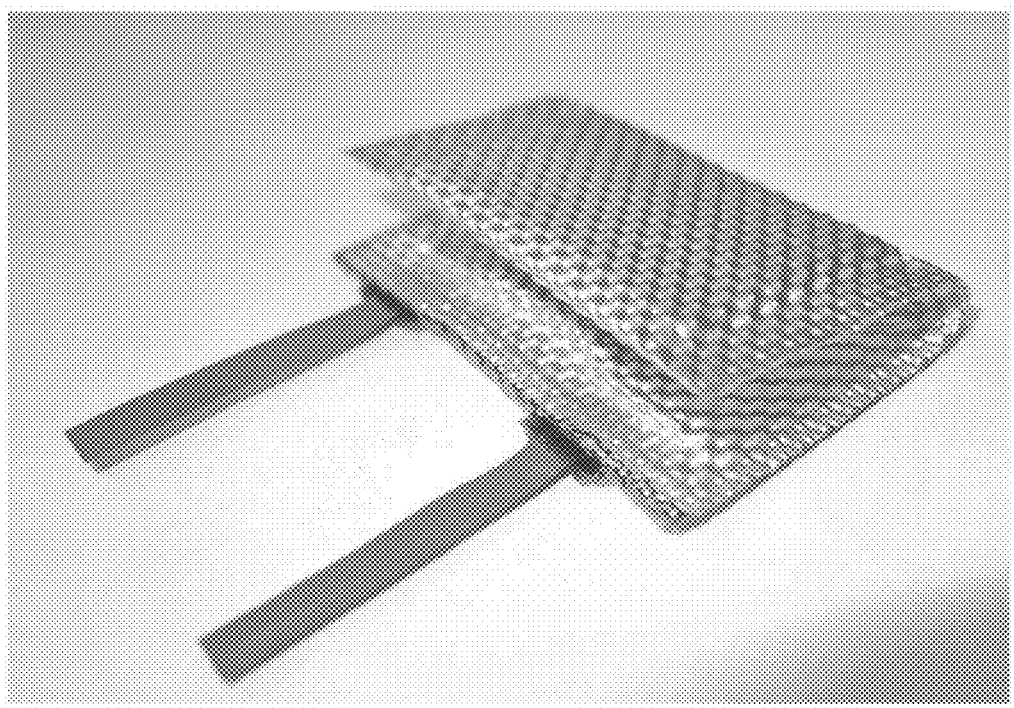
FIGS. 2A and 2B are a photograph and a schematic view of a secondary battery of one embodiment of the present invention.
Figure 2B:
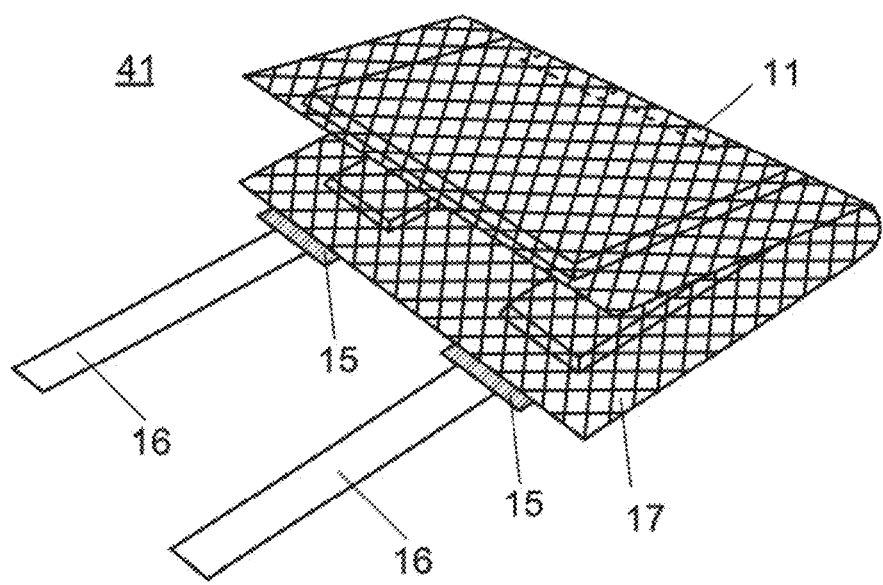

A secondary battery 41 can be fabricated in the manner described in Embodiment 1, except for the metal film 11 with a pattern. FIG. 2A is a photograph of the secondary battery 41 folded at the openings of the current collector and their vicinities. FIG. 2B is a schematic view thereof. An edge region in FIG. 2B is a thermocompression-bonded region 17. A surface of the thermocompression-bonded region 17 also has a pattern including unevenness. Although the unevenness in the thermocompression-bonded region 17 is smaller than that in a center portion, it can relieve stress applied when the secondary battery is bent.

The secondary battery 41 is bendable as a whole not only at the openings of the current collector and their vicinities that are foldable points because at least part of the exterior body is embossed. Note that the openings of the current collector and their vicinities that are foldable points can be bent at the smallest radius of curvature, and the other portions can be bent at a radius of curvature larger than that of the openings of the current collector and their vicinities. That is, the secondary battery 41 can be bent more smoothly than the secondary battery 40. When external stress is applied thereto, the secondary battery as a whole can relieve the external stress.

This embodiment can be freely combined with Embodiment 1.

Embodiment 3

In this embodiment, an example in which the thermocompression-bonded region 17 has a different area from that in Embodiment 1 will be described.

In Embodiment 1, an example in which only the periphery of the secondary battery is sealed by thermocompression bonding is described. In this embodiment, an example in which the openings of the current collector and their vicinities are also thermocompression bonded so as to prevent misalignment of the stacked components when the secondary battery is repeatedly bent at the foldable points will be described.

The structure is similar to that of Embodiment 1 except for the thermocompression-bonded region 17; therefore, detailed description is omitted in this embodiment.

FIG. 3 illustrates a secondary battery 42 described in this embodiment.

A metal film is formed into a bag shape. The components contained therein are the same as that in Embodiment 1; therefore, description is omitted here. The components are a positive electrode current collector with openings 20, a separator with openings, a negative electrode current collector with openings, an electrolytic solution, and the like.

The electrolytic solution is dropped to the inside of the metal film 10 in the form of a bag in the manner described in Embodiment 1. Then, the remaining open side of the periphery of the metal film 10 is sealed under vacuum, heat, and pressure. In addition, a region overlapping with the openings 20 is also thermocompression bonded, and then the secondary battery 42 can be fabricated.

Part of the separator is fixed to an adhesion layer of the metal film by thermocompression-bonding in a region overlapping with the openings 20 of the positive electrode current collector. Each of openings of the separator is smaller than each of the openings 20 of the positive electrode current collector in area. The inner edge of the opening of the separator is positioned inside the inner edge of the opening of the current collector. A region overlapping with the openings of the separator is a thin region because an adhesion layer of an upper metal film and an adhesion layer of a lower metal film are in direct contact with each other and thermocompression-bonded in the region. The region has substantially the same thickness as the thermocompression-bonded region of the periphery of the secondary battery.

The positive electrode current collector, the separator, and the negative electrode current collector are stacked and thermocompression bonded between the two openings 20 of the positive electrode current collector; thus, the region between the openings 20 is thicker than the openings.

This embodiment can be freely combined with Embodiment 1 or Embodiment 2.

Embodiment 4

In this embodiment, an example in which positions of the lead electrode and shapes of the current collector are different from those of Embodiment 1 will be described. In addition, an example in which a cushioning material is used for the foldable positions of the secondary battery will be described. Note that portions similar to those in Embodiment 1 are denoted by the same reference numerals and detailed description is omitted.

Figure 4A:
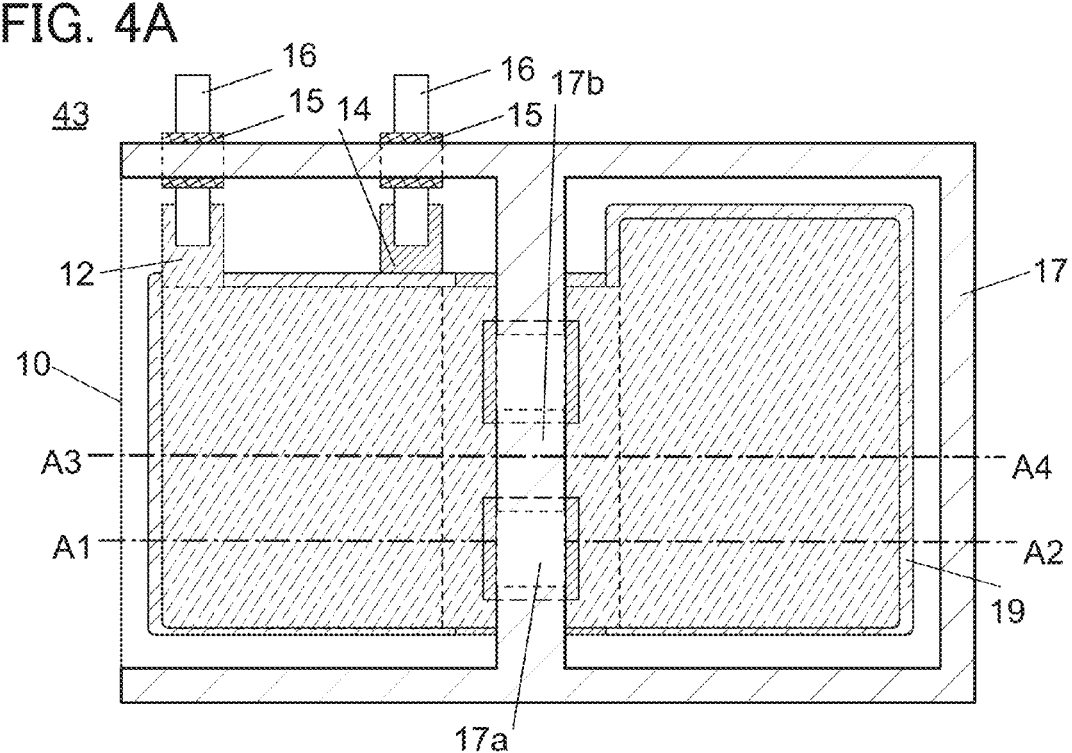
FIGS. 4A to 4C are each a top view of a secondary battery of one embodiment of the present invention.

FIG. 4A illustrates an example of a structure of a secondary battery 43. In an example in this embodiment, a radius of curvature at the foldable point of the secondary battery 43 is designed to be 3 mm.

In FIG. 4A, the positive electrode current collector 12 is provided over the negative electrode current collector 14 where the negative electrode active material layer 19 is selectively formed. Note that a separator provided between the negative electrode current collector 14 and the positive electrode current collector 12 is not illustrated.

Figure 4B:
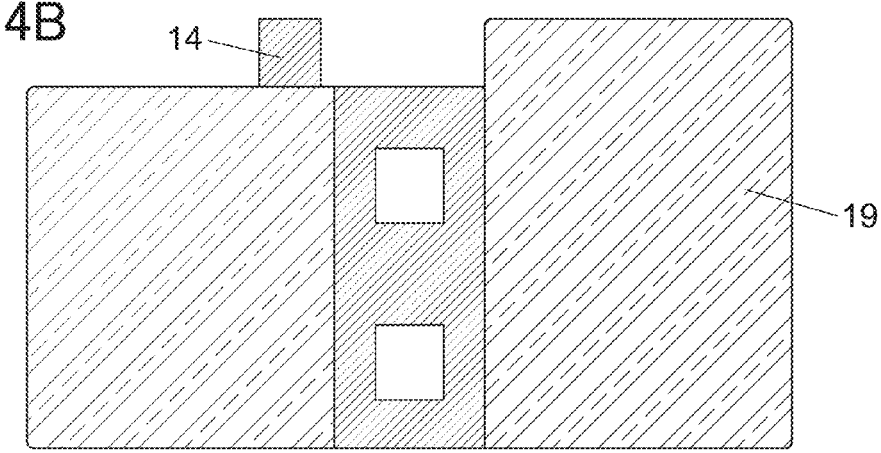

FIG. 4B is a top view of the negative electrode current collector 14 where the negative electrode active material layer 19 is selectively formed.

Figure 4C:
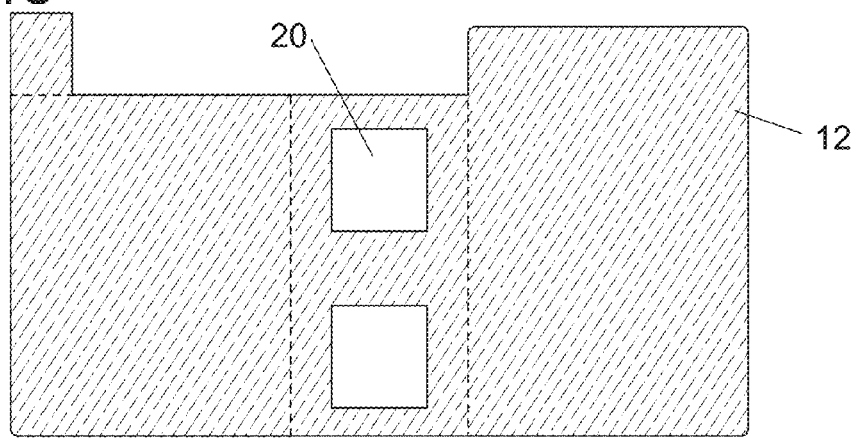

FIG. 4C is a top view of the positive electrode current collector 12 with the openings 20. Note that the openings and their vicinities are not provided with the positive electrode active material layers, and the edges of the positive electrode active material layers are denoted by dotted lines. The openings 20 of the positive electrode current collector 12 are larger in area than the openings of the negative electrode current collector. The structure in which the openings 20 of the positive electrode current collector 12 are larger in area than the openings of the negative electrode current collector has a stair-like cross section at the time of thermocompression-bonding for the openings, and can prevent the exterior body from being ruptured due to a larger step formed over a surface of the exterior body. This is particularly effective when a larger number of combinations of the positive electrode and the negative electrode are stacked for increasing the capacity of a secondary battery.

The thermocompression-bonded region 17 in FIG. 4A can be largely divided into four. The first is a first region of the periphery, the second is a second region overlapping with the lead electrode 16 with the sealing layer 15, the third is a third region 17a overlapping with each of the openings 20, and the fourth is a fourth region 17b between the two openings.

Figure 5A:
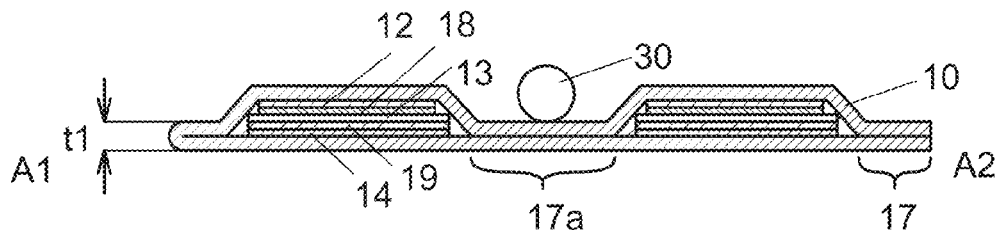
FIGS. 5A to 5D are each a cross-sectional view of a secondary battery of one embodiment of the present invention.

A cushioning material 30 is provided at a position overlapping with the third regions 17a and the fourth region 17b. That is, the cushioning material 30 is provided over the foldable points. FIG. 5A is a schematic cross-sectional view taken along a dashed-dotted line A1-A2 in FIG. 4A after the cushioning material 30 is provided.

A cylindrical resin, a cylindrical rubber, or a cylindrical metal is used as the cushioning material 30. The shape of the cushioning material 30 is not limited to a cylindrical shape as long as the foldable points of the secondary battery are not bent at a sharp angle; thus, an elliptic cylindrical shape, a semi-cylindrical shape, a triangular prism, a square prism, a pentagonal prism, a hexagonal prism, and the like can be given. For lighter weight, the cushioning material 30 may be formed using a porous material, and is preferably a hollow cylinder. The length of the cushioning material 30 may be set so that the cushioning material 30 does not project when the secondary battery is folded. When the cushioning material is short, a plurality of cushioning materials may be provided at a plurality of positions.

As illustrated in FIG. 5A, the first region and the third region 17a have the substantially same thickness t1. Note that the third region 17a may be provided with the separator 13, and in that case, the third region 17a is thicker than the first region.

Figure 5B:
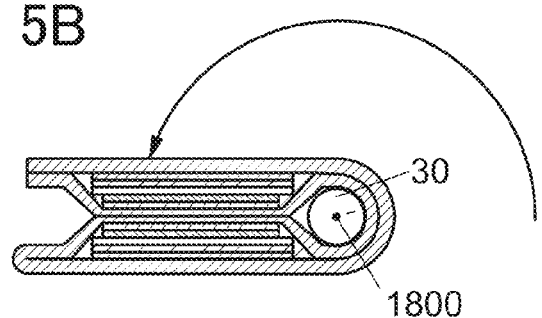
Figure 5C:
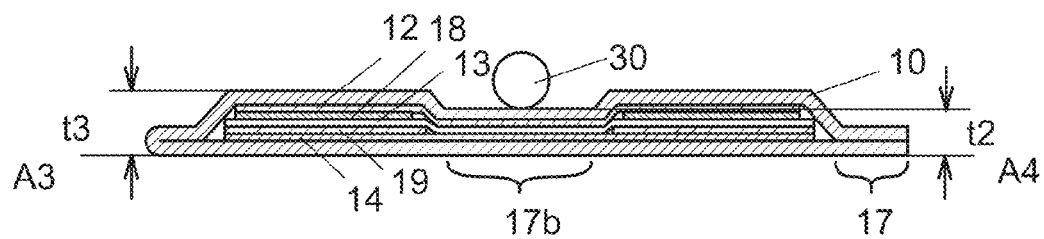

As illustrated in FIGS. 5A and 5C, the width of the third region 17a or the fourth region 17b is larger than the width of the first region (approximately 3 mm), and is approximately 10 mm in this embodiment.

FIG. 5B is a schematic cross-sectional view of a compact secondary battery 43 which is folded along a line connecting the openings of the current collector. The width of the third region 17a or the fourth region 17b is determined on the assumption that the secondary battery 43 is folded as illustrated in FIG. 5B. In this embodiment, a radius of curvature from the center of curvature 1800 at the foldable position of the secondary battery 43 is designed so as not to be less than 3 mm. Therefore, the diameter of the cushioning material 30 is approximately 6 mm and the width of the third region 17a or the fourth region 17b is approximately 10 mm; however, there is no particular limitation.

FIG. 5C is a schematic cross-sectional view taken along a dashed-dotted line A3-A4 in FIG. 4A after the cushioning material 30 is provided, and also refers to a schematic cross-sectional view of the fourth region 17b in the thremocompression-bonded region 17.

A thickness t2 of the fourth region 17b is thicker than each of the thickness of the first region and the thickness of the second region. In FIG. 5C, the negative electrode current collector 14, the separator 13, and the positive electrode current collector 12 are stacked in the fourth region 17b. It is important that the separator 13 is interposed between the negative electrode current collector 14 and the positive electrode current collector 12 so as to prevent a short-circuit therebetween.

In the secondary battery 43, the thickest region includes the metal film 10, the negative electrode current collector 14, the negative electrode active material layer 19, the separator 13, the positive electrode active material layer 18, and the positive electrode current collector 12, and has a thickness t3 that is a total thickness thereof. In this embodiment, the thickness t3 is approximately 3 mm.

Figure 6A:
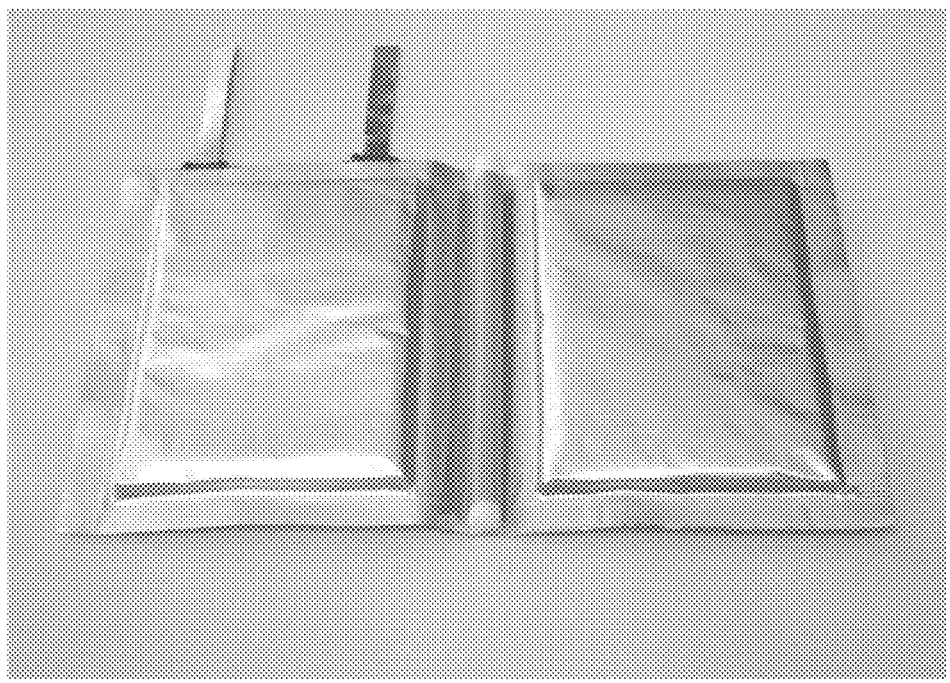
FIGS. 6A and 6B are each a photograph of a secondary battery of one embodiment of the present invention.
Figure 6B:
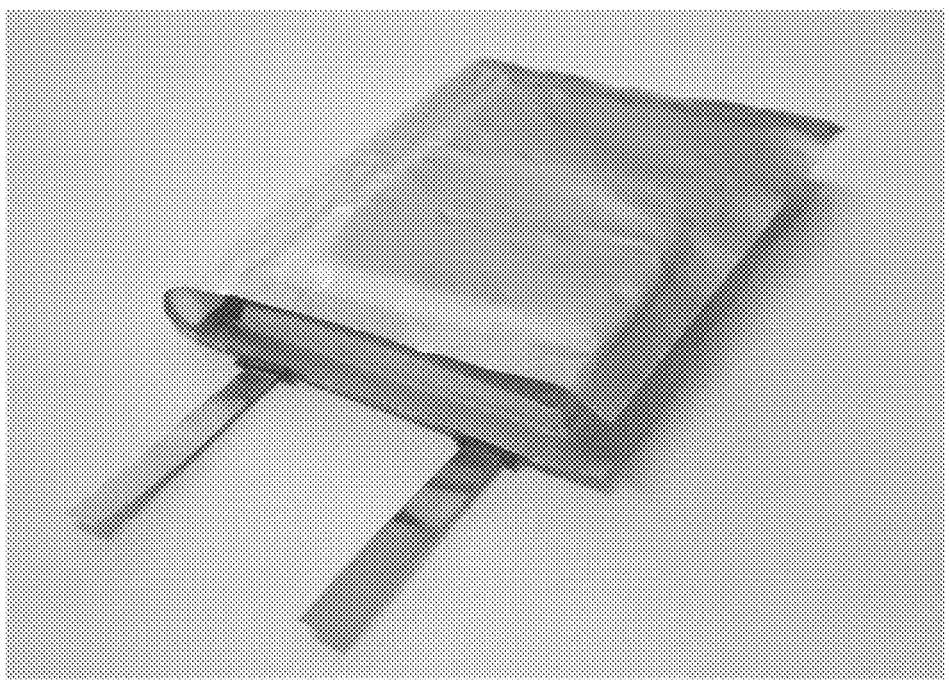
Figure 7A:
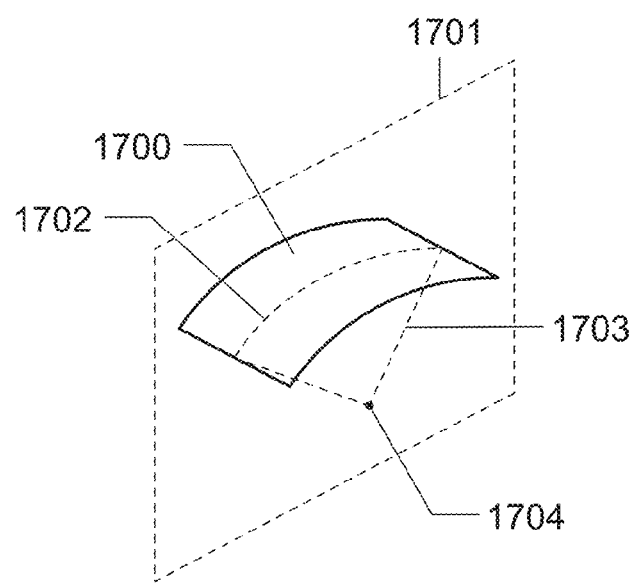
FIGS. 7A to 7C illustrate a radius of curvature of a surface.
Figure 7B:
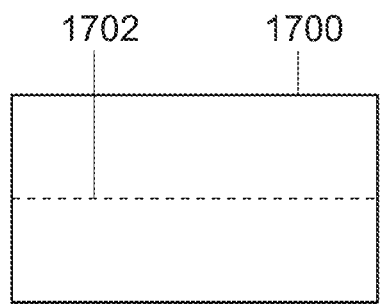
Figure 7C:
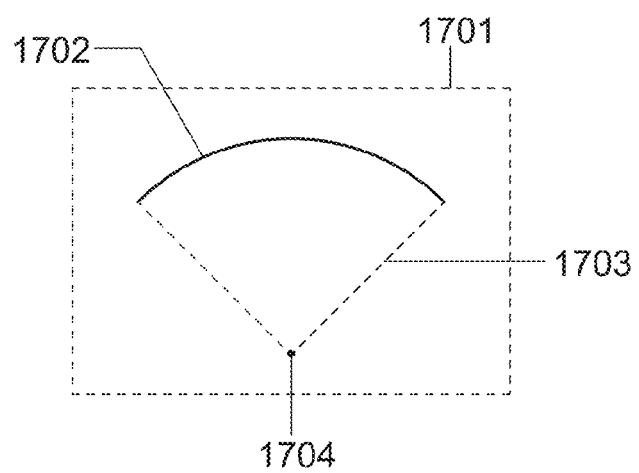

FIGS. 6A and 6B are each a photograph of the secondary battery 43 the foldable portion of which is provided with the cushioning material 30.

FIG. 6A is a photograph taken from above and FIG. 6B is a photograph of the secondary battery folded at the foldable position.

From the actual fabrication, it is found that the exterior body can keep a radius of curvature of 3 mm with the use of a 6-mm-diameter cushioning material. The provision of the cushioning material 30 guides the foldable position to a determined portion as compared with the case without the cushioning material, and can prevent the secondary battery from being bent more sharply than it needs to be.

Figure 5D:
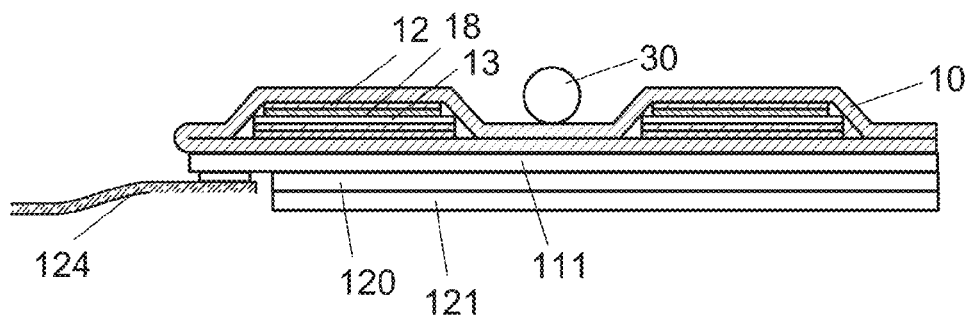

FIG. 5D is a schematic cross-sectional view of the secondary battery which is provided to overlap with a flexible display panel. When the secondary battery is bent, the flexible display panel can be bent along the secondary battery. Note that the flexible display panel is more flexible than the secondary battery and can withstand 100,000 bending operations at a radius of curvature of 2 mm. The flexible display panel is very thin and is preferably provided with a support member such as a support plate for supporting it. The secondary battery described in this embodiment can function as the supporting member.

Figure 10:
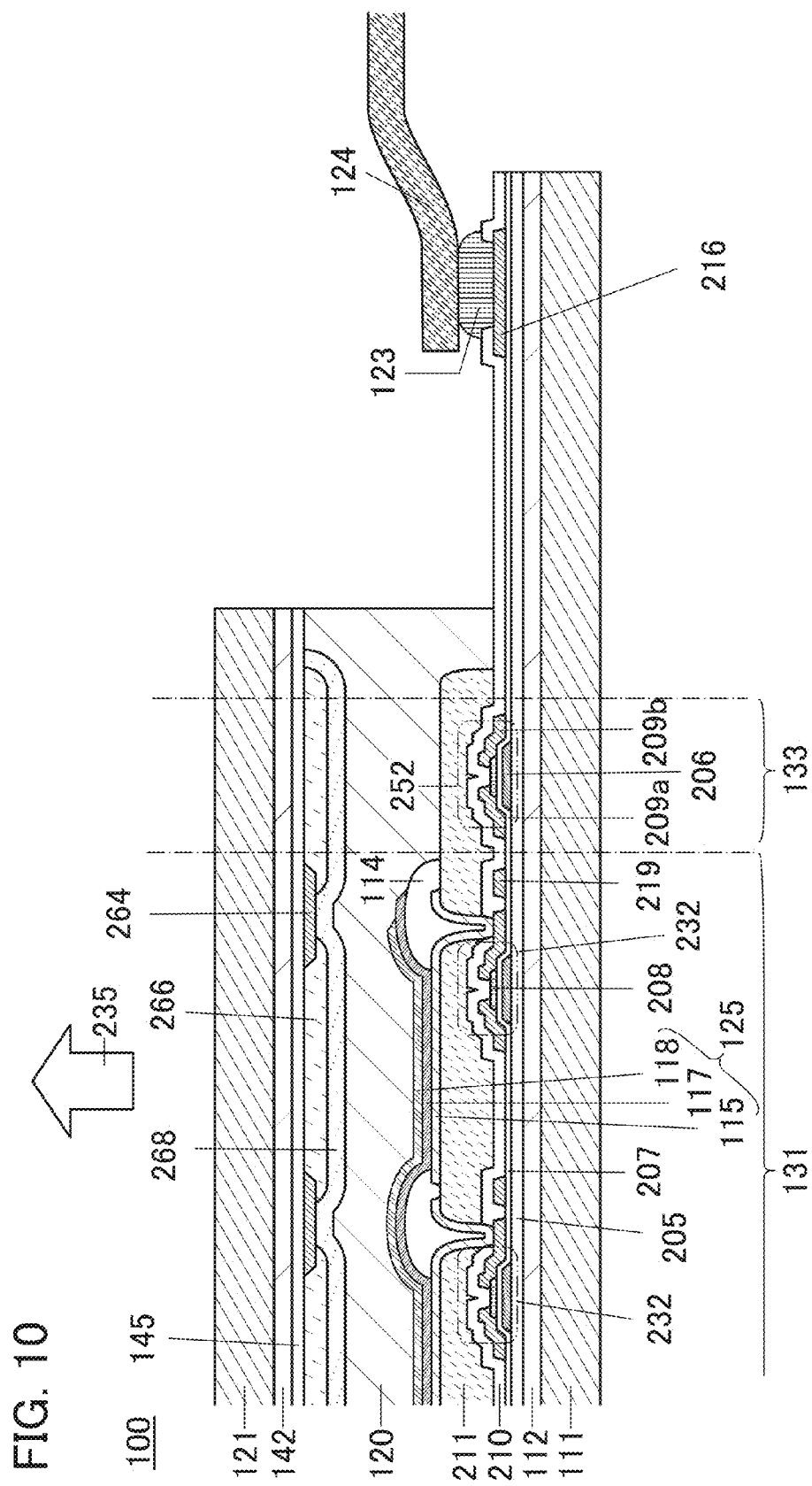
FIG. 10 is a cross-sectional view of a display panel of one embodiment of the present invention.

FIG. 5D is a simple view illustrating only substrates 111 and 121 with different external dimensions, an adhesive layer 120 adhering the two substrates to each other, and an external electrode 124 such as a flexible printed circuit (FPC) and a tape carrier package (TCP). FIG. 10 is a detailed cross-sectional view of the flexible display panel.

A display panel 100 in FIG. 10 includes a display region 131 and a circuit 133. The display panel 100 also includes a terminal electrode 216 and a light-emitting element 125 including an electrode 115, an EL layer 117, and an electrode 118. A plurality of light-emitting elements 125 are formed in the display region 131. A transistor 232 for controlling the amount of light emitted from the light-emitting element 125 is connected to each light-emitting element 125.

An external electrode 124 and the terminal electrode 216 are electrically connected to each other through an anisotropic conductive connection layer 123. The other part of the terminal electrode 216 is electrically connected to the circuit 133.

The circuit 133 includes a plurality of transistors 252. The circuit 133 has a function of determining which light-emitting element 125 in the display region 131 is supplied with a signal through the external electrode 124.

The transistor 232 and the transistor 252 each include a gate electrode 206, a gate insulating layer 207, a semiconductor layer 208, a source electrode 209a, and a drain electrode 209b.

The semiconductor layer 208 can be formed using an amorphous semiconductor, a microcrystalline semiconductor, a polycrystalline semiconductor, or the like. For example, amorphous silicon or microcrystalline germanium can be used. Alternatively, a compound semiconductor such as silicon carbide, gallium arsenide, an oxide semiconductor, or a nitride semiconductor, an organic semiconductor, or the like can be used.

In the case where an oxide semiconductor is used for the semiconductor layer 208, the density of defect states at the interface between the gate insulating layer 207 and the semiconductor layer 208 can be reduced by providing the oxide insulating layer on the semiconductor layer 208 side. Consequently, a transistor whose electrical characteristics are hardly degraded can be obtained. Note that in the case where an oxide semiconductor is used for the semiconductor layer 208, an oxide insulating layer containing oxygen in a proportion higher than that in the stoichiometric composition is preferably formed as the oxide insulating layer. This is because the density of defect states at the interface between the gate insulating layer 207 and the semiconductor layer 208 can be further reduced.

A wiring 219 is formed in the same layer as the source electrode 209a and the drain electrode 209b. In addition, an insulating layer 210 is formed over the transistor 232 and the transistor 252, and an insulating layer 211 is formed over the insulating layer 210. The electrode 115 is formed over the insulating layer 211. The electrode 115 is electrically connected to the drain electrode 209b through an opening formed in the insulating layer 210 and the insulating layer 211. The partition 114 is formed over the electrode 115, and the EL layer 117 and the electrode 118 are formed over the electrode 115 and the partition 114.

In the display panel 100, a substrate 111 and a substrate 121 are attached to each other with an adhesive layer 120 provided therebetween.

One surface of the substrate 111 is provided with an insulating layer 205 with an adhesive layer 112 positioned therebetween. One surface of the substrate 121 is provided with an insulating layer 145 with an adhesive layer 142 positioned therebetween. The one surface of the substrate 121 is provided with a light-blocking layer 264 with the insulating layer 145 positioned therebetween. The one surface of the substrate 121 is also provided with a coloring layer 266 and an overcoat layer 268 with the insulating layer 145 positioned therebetween.

The insulating layer 205 functions as a base layer and can prevent or reduce diffusion of moisture or impurity elements from the substrate 111, the adhesive layer 112, or the like to the transistor or the light-emitting element. The insulating layer 145 functions as a base layer and can prevent or reduce diffusion of moisture or impurity elements from the substrate 121, the adhesive layer 142, or the like to the transistor or the light-emitting element.

The insulating layer 205 and the insulating layer 145 are preferably formed as a single layer or a multilayer using any of silicon oxide, silicon nitride, silicon oxynitride, silicon nitride oxide, aluminum oxide, aluminum oxynitride, aluminum nitride oxide, and the like. The insulating layer 205 and the insulating layer 145 can be formed by a sputtering method, a CVD method, a thermal oxidation method, a coating method, a printing method, or the like.

A flexible material such as an organic resin material, or the like can be used for the substrate 111 and the substrate 121. The display panel 100 is a display device having a top-emission structure, and a material that can transmit light emitted from the EL layer 117 is used for the substrate 121.

If the mechanical strength of a material used for the substrate 111 and the substrate 121 is too low, the substrates easily become deformed at the time of manufacture of the display panel 100, which reduces yield and thus, contributes to a reduction in productivity. Yet, if the mechanical strength of the material used for the substrate 111 and the substrate 121 is too high, the display device becomes difficult to bend. An index of the mechanical strength of a material is Young's modulus. The Young's modulus of a material suitable for the substrate 111 and the substrate 121 is larger than or equal to 1 GPa ($1\times10^9$ Pa) and smaller than or equal to 100 GPa ($100\times10^9$ Pa), preferably larger than or equal to 2 GPa and smaller than or equal to 50 GPa, further preferably larger than or equal to 2 GPa and smaller than or equal to 20 GPa. Note that in measurement of Young's modulus, ISO527, JISK7161, JISK7162, JISK7127, ASTMD638, ASTMD882, or the like can be referred to.

The thickness of each of the substrate 111 and the substrate 121 is preferably greater than or equal to 5 μm and less than or equal to 100 μm, further preferably greater than or equal to 10 μm and less than or equal to 50 μm. One or both of the substrate 111 and the substrate 121 may be a stacked-layer substrate that includes a plurality of layers.

It is preferable that the substrate 111 and the substrate 121 be formed using the same material and have the same thickness. However, depending on the purpose, the substrates 111 and 121 may be formed using different materials or have different thicknesses.

Examples of materials that have flexibility and transmit visible light, which can be used for the substrate 111 and the substrate 121, include a polyethylene terephthalate resin, a polyethylene naphthalate resin, a polyacrylonitrile resin, a polyimide resin, a polymethylmethacrylate resin, a polycarbonate resin, a polyethersulfone resin, a polyamide resin, a cycloolefin resin, a polystyrene resin, a polyamide imide resin, a polyvinylchloride resin, and polytetrafluoroethylene (PTFE). Furthermore, when a light-transmitting property is not necessary, a non-light-transmitting substrate may be used. For example, aluminum or the like may be used for the substrate 111 or the substrate 121.

The thermal expansion coefficients of the substrate 111 and the substrate 121 are preferably less than or equal to 30 ppm/K, further preferably less than or equal to 10 ppm/K. In addition, on surfaces of the substrate 111 and the substrate 121, a protective film having low water permeability may be formed in advance; examples of the protective film include a film containing nitrogen such as a silicon nitride film, a silicon oxynitride film, and an aluminum nitride film. Note that a structure in which a fibrous body is impregnated with an organic resin (also called prepreg) may be used as the substrate 111 and the substrate 121.

With such substrates, a non-breakable display device can be provided. Alternatively, a lightweight display device can be provided. Alternatively, an easily bendable display device can be provided.

Although a kind of bottom-gate transistors is illustrated as the transistor 232 in FIG. 10, there is no particular limitation. A channel-protective transistor or a top-gate transistor can also be used.

A method of forming the transistor 232 over the substrate 111 is not particularly limited. In one example, a separation layer is provided over a glass substrate, and the transistor 232 and the light-emitting element 125 are formed thereover. After that, the glass substrate is removed using the separation layer and the substrate 111 is fixed using the adhesive layer 112. The separation layer used in this case can be formed using an element selected from tungsten, molybdenum, titanium, tantalum, niobium, nickel, cobalt, zirconium, ruthenium, rhodium, palladium, osmium, iridium, and silicon; an alloy material containing any of the elements; or a compound material containing any of the elements. The separation layer can also be formed to have a single-layer structure or a stacked-layer structure using any of the materials. Note that the crystalline structure of the separation layer may be amorphous, microcrystalline, or polycrystalline. The separation layer can also be formed using a metal oxide such as aluminum oxide, gallium oxide, zinc oxide, titanium dioxide, indium oxide, indium tin oxide, indium zinc oxide, or InGaZnO (IGZO).

In the other example, the transistor 232 is formed over the substrate 111 in such a manner that a separation layer formed using a resin material such as a polyimide resin is provided over a glass substrate, the transistor 232 and the light-emitting element 125 are formed thereover, and after that, the glass substrate is removed by performing heat treatment such as laser light treatment to fix the substrate 111 using the adhesive layer 112.

When a process temperature for forming the transistor 232 is lower than the upper temperature limit of the substrate 111, the transistor 232 can be formed over the substrate 111 without forming the separation layer. In that case, the adhesive layer 112 is not needed because the separation process is not performed; thus, the forming processes can be largely reduced.

Figure 8A:
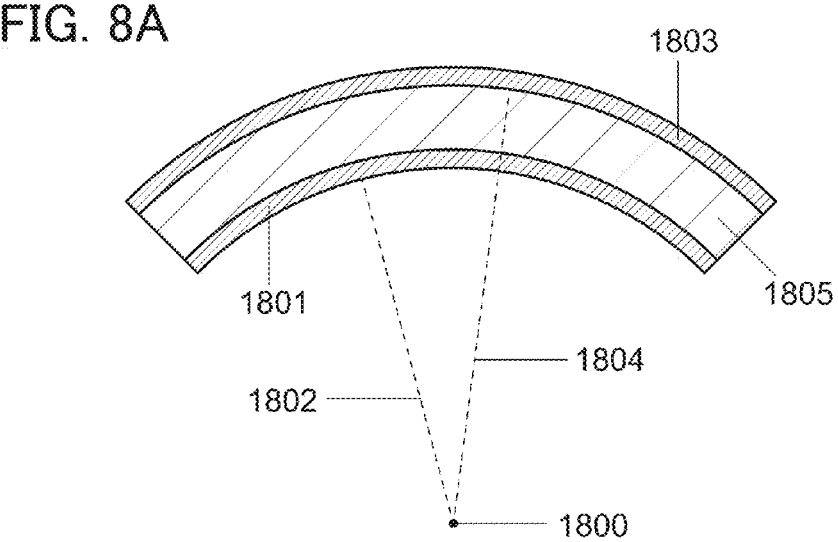
FIGS. 8A to 8D illustrate a center of curvature.
Figure 8B:
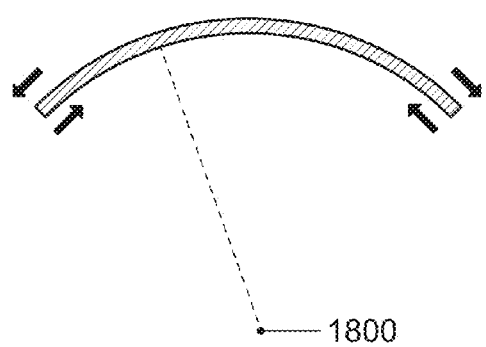
Figure 8C:
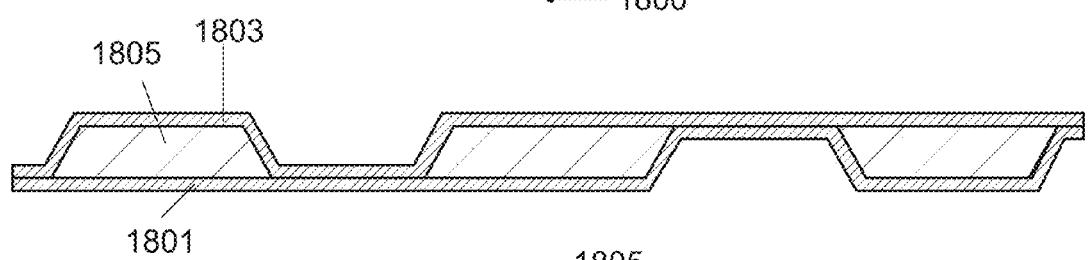
Figure 8D:
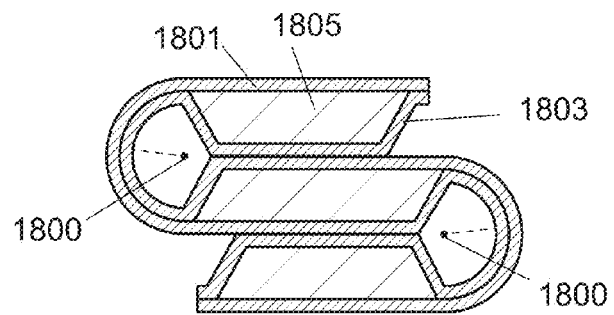

In this embodiment, an example of a flexible display panel which is folded along the two-foldable secondary battery is described; however, there is no particular limitation. The three-foldable secondary battery in FIGS. 8C and 8D can also be provided with a flexible display panel. In that case, the three-foldable secondary battery can overlap with a three-foldable flexible display panel, and an electronic device in which the display panel can be folded along the folded secondary battery can be provided.

This embodiment can be freely combined with any of the other embodiments.

Embodiment 5

Figure 9A:
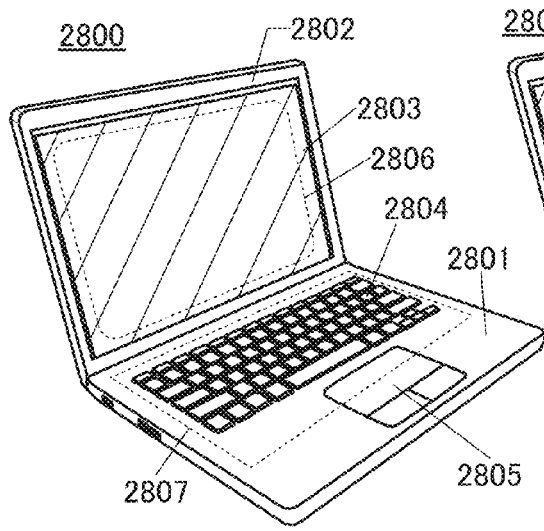
FIGS. 9A to 9E are each a perspective view of an electronic device of one embodiment of the present invention.
Figure 9B:
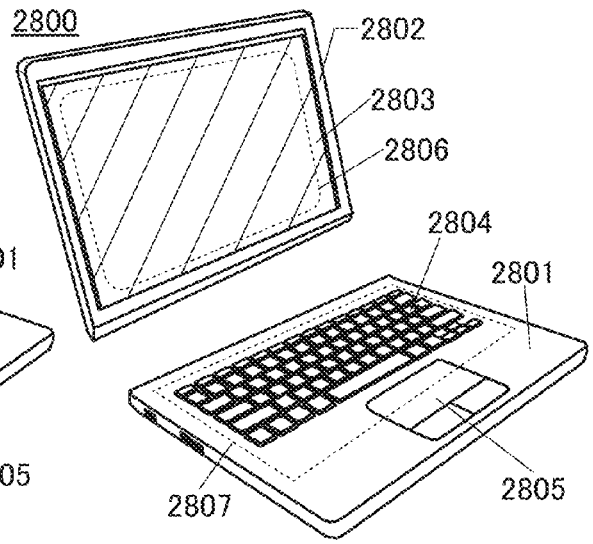

A personal computer 2800 illustrated in FIG. 9A includes a housing 2801, a housing 2802, a display portion 2803, a keyboard 2804, a pointing device 2805, and the like. A secondary battery 2806 is provided inside the housing 2801 and a secondary battery 2807 is provided inside the housing 2802. A touch panel is used for the display portion 2803. As illustrated in FIG. 9B, the housing 2801 and the housing 2802 of the personal computer 2800 can be separated and the housing 2802 can be used alone as a tablet computer.

Figure 9C:
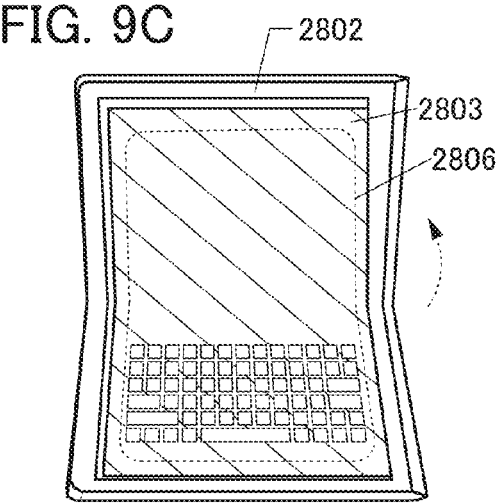

A flexible display panel is used for the display portion 2803 of the housing 2802. For the flexible display panel, the display panel described in Embodiment 4 can be used. In addition, a foldable secondary battery is used as the secondary battery 2807. As the foldable secondary battery, the secondary battery described in any one of Embodiments 1 to 4 is used. Thus, as illustrated in FIG. 9C, the housing 2802 can be used while being bent. At this time, part of the display portion 2803 can also be used as a keyboard as illustrated in FIG. 9C.

Figure 9D:
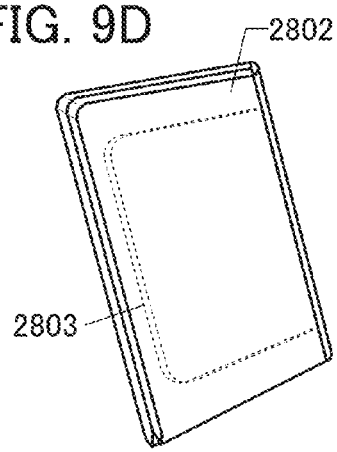
Figure 9E:
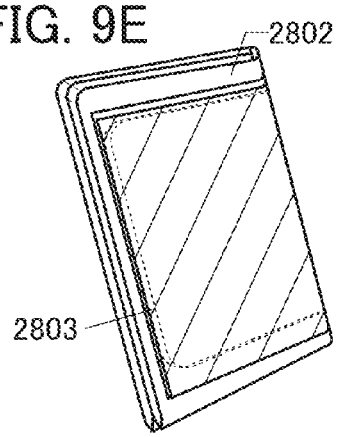

Furthermore, the housing 2802 can be folded so that the display portion 2803 is on the inside as illustrated in FIG. 9D, and the housing 2802 can be folded so that the display portion 2803 is on the outside as illustrated in FIG. 9E.

This application is based on Japanese Patent Application serial No. 2015-149254 filed with Japan Patent Office on Jul. 29, 2015, the entire contents of which are hereby incorporated by reference.

What is claimed is:

1. A secondary battery comprising:
a first current collector;
a second current collector;
a separator; and
an exterior body,
wherein the secondary battery comprises a first region and a second region,
wherein the first current collector and the second current collector overlap with each other in the first region,
wherein the second region is thinner than the first region,
wherein the second region comprises a region,
wherein an opening of the first current collector and an opening of the second current collector overlap with each other in the region, and
wherein the second region comprises a foldable point of the secondary battery.

2. The secondary battery according to claim 1, wherein an opening of the separator and the opening of the first current collector overlap with each other in the second region.

3. The secondary battery according to claim 1, further comprising a cylindrical cushioning material overlapping with the second region,
wherein the cylindrical cushioning material has a diameter of 30 mm or less.

4. The secondary battery according to claim 1, wherein a radius of curvature of the foldable point of the secondary battery is less than or equal to 30 mm.

5. The secondary battery according to claim 1, wherein the exterior body comprises a metal film.

6. An electronic device comprising:
a display portion comprising a foldable point; and
the secondary battery according to claim 1,
wherein the foldable point of the display portion and the foldable point of the secondary battery overlap with each other.

7. The electronic device according to claim 6,
wherein the display portion comprises a display element over a flexible film.

8. A secondary battery comprising:
a first current collector;
a second current collector;
a separator;
an electrolytic solution; and
an exterior body,
wherein the secondary battery comprises a first region, a second region, a third region, and a fourth region,
wherein the first current collector and the second current collector overlap with each other in the first region and the second region,
wherein a thickness of the third region is less than that of the first region and that of the second region,
wherein the fourth region is a periphery of the secondary battery,
wherein the fourth region is in contact with the first region, the second region, and the third region, wherein the third region is a pressure-bonded region between the first region and the second region wherein the electrolytic solution is surrounded by the exterior body in each of the first region and the second region, and wherein a thickness of the fourth region is equal to or less than that of the third region.

9. The secondary battery according to claim 8, wherein the third region comprises a foldable point of the secondary battery.

10. The secondary battery according to claim 8, wherein an opening of the first current collector, an opening of the second current collector, and an opening of the separator overlap with each other in the third region.

11. The secondary battery according to claim 8, further comprising a cylindrical cushioning material overlapping with the third region, wherein the cylindrical cushioning material has a diameter of 30 mm or less.

12. The secondary battery according to claim 9, wherein a radius of curvature of the foldable point of the secondary battery is less than or equal to 30 mm.

13. The secondary battery according to claim 8, wherein the exterior body comprises a metal film.

14. An electronic device comprising:

a display portion comprising a foldable point; and the secondary battery according to claim 9, wherein the foldable point of the display portion and the foldable point of the secondary battery overlap with each other.

15. The electronic device according to claim 14, wherein the display portion comprises a display element over a flexible film.

* * * * *